United States Patent
Yamamoto et al.

(10) Patent No.: US 7,839,610 B2
(45) Date of Patent: Nov. 23, 2010

(54) LOAD DRIVING DEVICE AND ELECTRICAL DEVICE USING THE SAME

(75) Inventors: Seiichi Yamamoto, Kyoto (JP); Takahiro Ota, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 400 days.

(21) Appl. No.: 11/865,892

(22) Filed: Oct. 2, 2007

(65) Prior Publication Data
US 2008/0084241 A1 Apr. 10, 2008

(30) Foreign Application Priority Data
Oct. 4, 2006 (JP) ............................. 2006-272775

(51) Int. Cl.
*H02H 7/08* (2006.01)
*H02H 7/04* (2006.01)
*H02H 3/08* (2006.01)

(52) U.S. Cl. ............................. 361/30; 361/23; 361/36; 361/93.1

(58) Field of Classification Search .................... 361/30, 361/23, 36, 93.1
See application file for complete search history.

(56) References Cited

U.S. PATENT DOCUMENTS

| | | | | |
|---|---|---|---|---|
| 4,947,091 A | * | 8/1990 | Fukuoka | 318/434 |
| 5,444,595 A | * | 8/1995 | Ishikawa et al. | 361/86 |
| 6,831,821 B2 | * | 12/2004 | Ohshima | 361/86 |
| 7,015,665 B2 | * | 3/2006 | Ohshima | 318/280 |
| 7,443,645 B2 | * | 10/2008 | Ohshima | 361/79 |

FOREIGN PATENT DOCUMENTS

JP      05-55798      7/1993

* cited by examiner

*Primary Examiner*—Fritz M. Fleming
*Assistant Examiner*—Lucy Thomas
(74) *Attorney, Agent, or Firm*—Fish & Richardson P.C.

(57) ABSTRACT

A load driving device according to the present invention includes: a first current generation section generating a first current in accordance with a driving current of a load; a second current generation section generating a predetermined second current; an integration section charging and discharging a capacitor in accordance with magnitude relation between the first current and the second current; a comparison section comparing a terminal voltage of the capacitor and a predetermined threshold voltage; and an output section generating a protection signal based on output logic of the comparison section. Such configuration permits appropriately preventing load burnout.

10 Claims, 5 Drawing Sheets

LOAD DRIVING DEVICE AND ELECTRICAL DEVICE USING THE SAME

This application is based on Japanese Patent Application No. 2006-272775 filed on Oct. 4, 2006, the contents of which are hereby incorporated by reference.

BACKGROUND OF THE INVENTION

1. Field of the Invention

The present invention relates to a load driving device for supplying a driving current to a load and an electrical device (for example, an optical disc driving device) using such a load driving device.

2. Description of Related Art

In a car navigation system, a car audio system, or a portable navigation system including an optical disc driving device that performs recording and reproduction on an optical disc such as a DVD (Digital Versatile Disc), a CD (Compact Disc), an MD (Mini Disc), or the like, a beam spot is formed on the recording surface of the optical disc by using a pickup lens to thereby perform data recording and reproduction on the optical disc. As an actuator for making fine adjustment of an optical pickup position, a focus coil, a tracking coil, a tilt coil, or the like is used.

The actuator coil for a pickup lens described above, although being a light, small component, is driven by flow of a relatively large current, and thus generates large heat and is easy to burn out.

Therefore, conventionally employed as techniques of protecting an actuator coil from overcurrent-induced burnout are a technique of muting all coil outputs when a maximum output of the actuator coil (condition in which an amplifier output is off-scale) is detected continuously for a certain period of time (for example, 300 [ms]), a technique of monitoring a power current of a driver driving a plurality of actuator coils to thereby control a peak current, a technique of monitoring a control signal of a driver with a DSP (Digital Signal Processor) in a software-based manner to thereby control a peak current, and a technique of detecting a drive voltage to a coil to thereby control a peak current.

As one of conventional technologies related to the above, JP-UM-H05-55798 (hereinafter, referred to as Patent Document 1) discloses and proposes a speed-controllable coil burnout preventing device for a blushless motor, including: a magnetic detection element for detecting rotor rotation position of a motor; a position signal amplifying circuit for amplifying an output signal of the magnetic detection element; an output circuit, a coil for a stator of the motor; a capacitor for storing charges; a rotation detection circuit for generating a pulse in synchronization with the rotor rotation position; a first flip flop circuit reset by an output pulse of the rotation detection circuit; a charging circuit for supplying charges to the capacitor; a first comparator circuit for inverting the first flip flop circuit to stop charging when a potential of the capacitor is turned by a charge current of the charging circuit to a predetermined first potential; a charging/discharging circuit for synthesizing a charging current and a discharging current by utilizing constant current difference and supplying the synthesized current to the capacitor mainly at a time of motor locking in which pulse generation in the rotation detection circuit has stopped; a second flip flop circuit for holding charged state and discharged state of the capacitor; a discharge transistor; an inversion detection transistor for detecting timing for transition from charged state to discharged state of the capacitor; a breaking/resetting circuit for breaking power distribution to the coil through the output circuit when the potential of the capacitor increases to a second potential that is larger than the first potential; a pulse circuit for generating a reset pulse when the potential of the capacitor decreases to a predetermined third potential that is lower than the first potential; a second comparator circuit with hysteresis for detecting that the potential of the capacitor has increased to the second potential and has decreased to the predetermined third potential; an inverter circuit; and an OR circuit for controlling the breaking/resetting circuit based on the OR of an output of the first flip flop circuit and an output of the second comparator circuit.

Burnout of the actuator coil can be definitely reduced by applying the conventional protection techniques described above to a motor driver IC.

However, with the technique of muting all coil outputs when a maximum output of the actuator coil is detected continuously for a certain period of time, overcurrent is not detected in a case where driving is continued immediately before the maximum output of the actuator coil, thus causing a risk of occurrence of burnout.

With the technique of monitoring a power current of a driver driving a plurality of actuator coils to thereby control a peak current, a risk of failure to detect overcurrent arises when there is bias in the driving current of each actuator coil.

With the technique of detecting a control signal of a driver with a DSP (Digital Signal Processor) in a software-based manner to thereby control a peak current, a driving current is indirectly detected, which results in an increase in variation in the driving current to a coil due to variation in a coil and a driver driving signal, thus causing a risk of failure to detect overcurrent with high accuracy.

With the technique of detecting a driving voltage to a coil to thereby control a peak current, variation in the driving current due to variation in the coil cannot be detected.

The conventional technology of Patent Document 1 is just technology of stopping operation of an output circuit upon detection that a motor unintentionally falls into stopped state when the motor rotation stops due to some external factor, and entails different essential configuration from that of the present invention.

SUMMARY OF THE INVENTION

In view of the problem described above, it is an object of the present invention to provide a load driving device capable of appropriately preventing load burnout and an electrical device using such a load driving device.

To achieve the object described above, a load driving device according to the present invention includes: a first current generation section generating a first current in accordance with a driving current of a load; a second current generation section generating a predetermined second current; an integration section charging and discharging a capacitor in accordance with magnitude relation between the first current and the second current; a comparison section comparing a terminal voltage of the capacitor and a predetermined threshold voltage; and an output section generating a protection signal based on output logic of the comparison section.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Hereinafter, detailed description will be given, referring to a case where the present invention is applied to a motor driver IC loaded in an optical disc driving device.

Figure 1:
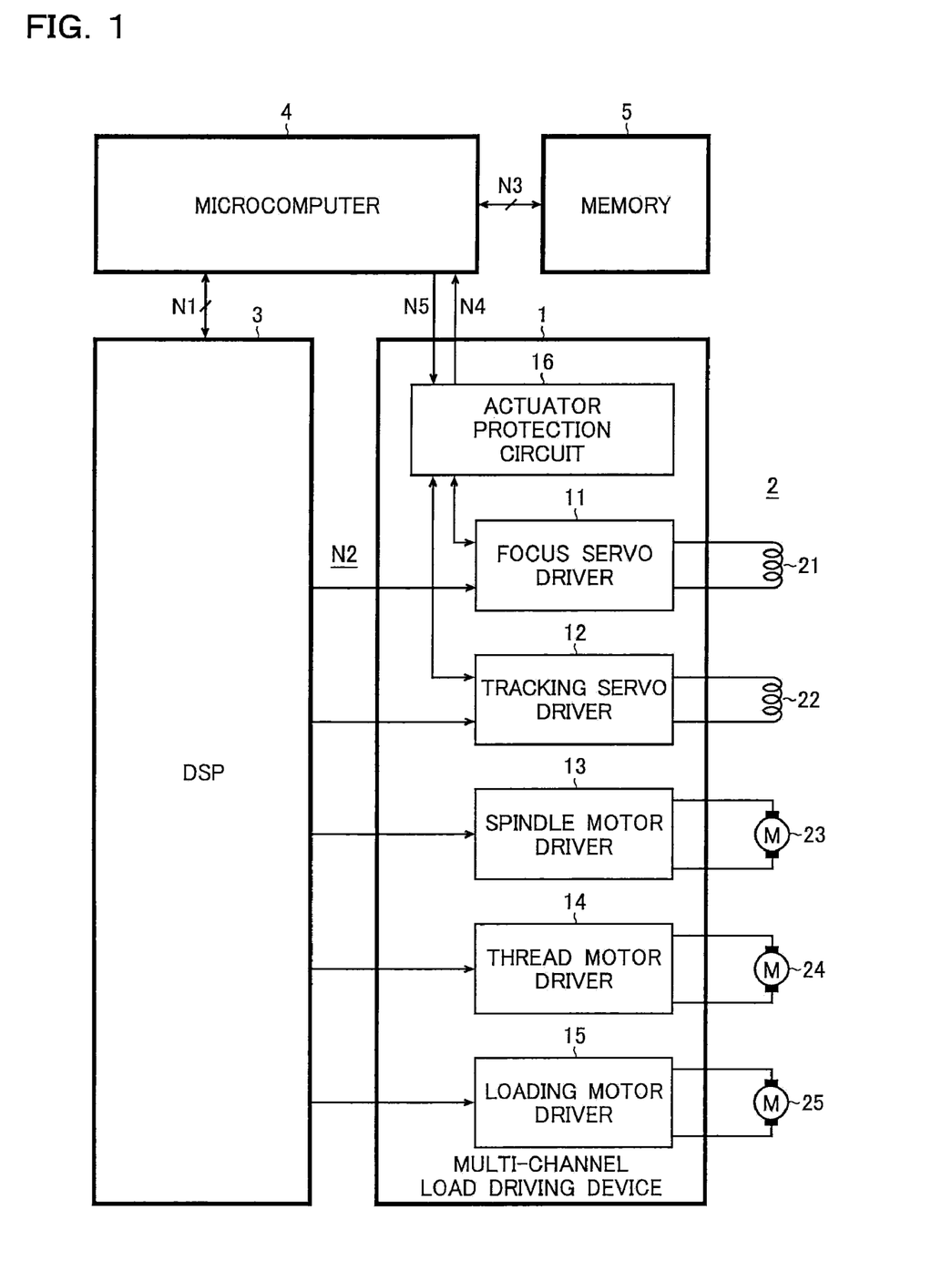
FIG. 1 is a block diagram showing one embodiment of an optical disc driving device according to the present invention.

FIG. 1 is a block diagram showing one embodiment of the optical disc driving device according to the invention.

As shown in this figure, the optical disc driving device of this embodiment has a motor driver IC 1, loads 2, a digital signal processor 3 (hereinafter, referred to as DSP (Digital Signal Processor) 3), a microcomputer 4, and a memory 5.

The motor driver IC1 includes: a focus servo driver circuit 11, a tracking servo driver circuit 12, a spindle motor driver circuit 13, a thread motor driver circuit 14, and a loading motor deriver circuit 15. The motor driver IC1 is a multi-channel load driving device that supplies driving currents respectively to a plurality of loads 2 (a focus servo coil 21, a tracking servo coil 22, a spindle motor 23, a thread motor 24, and a loading motor 25) based on a driving signal N2 from the DSP 3.

The motor driver IC1 also includes an actuator protection circuit 16 that, when overcurrent is generated in either of the focus servo driver circuit 11 and the tracking servo driver circuit 12, first restricts or stops output operation of the both and then transmits to the microcomputer 4 a protection signal N4 indicating this event. Configuration and operation of the actuator protection circuit 16 will be described in detail later.

Of the loads 2, the focus servo coil 21 is means adapted to drive a pickup lens (not shown) and perform focus control on a beam spot formed on an optical disc. The tracking servo coil 22 is means adapted to drive the pickup lens and performs tracking control on the beam spot formed on the optical disc. The spindle motor 23 is means adapted to drives a turn table (not shown) loaded on the optical disc into rotation at a constant linear speed or a constant rotation speed, and a DC motor with a brush or a three-phase blushless motor can be used as the spindle motor 23. The thread motor 24 is means adapted to drive an optical pickup in a radial direction of the optical disc, and a DC motor with a brush or a two-phase blushless stepping motor can be used as the thread motor 24. The loading motor 25 is means adapted to forwardly and backwardly drive a loading tray (not shown) loaded on the optical disc, and a DC motor with a brush can be used as the loading motor 25.

The DSP3 is means adapted to transmit driving signals N2 respectively to a plurality of driver circuits 11 to 15 based on a control signal N1 from the microcomputer 4.

The microcomputer 4 is means adapted to integrally control operation of the various devices, and is especially in charge of transmitting the control signal N1 to the DSP3, monitoring the protection signals N4 transmitted from the motor driver IC1, storing and referring to error history information N3 by using the memory 5, and transmitting a release signal N5 to the motor driver IC1.

The memory 5 is used as a program storage region or operation region of the microcomputer 4, and also as storage means for storing the error history information N3 of the motor driver IC1.

Next, circuit configuration of the actuator protection circuit 16 will be described in detail, referring to FIG. 2.

Figure 2:
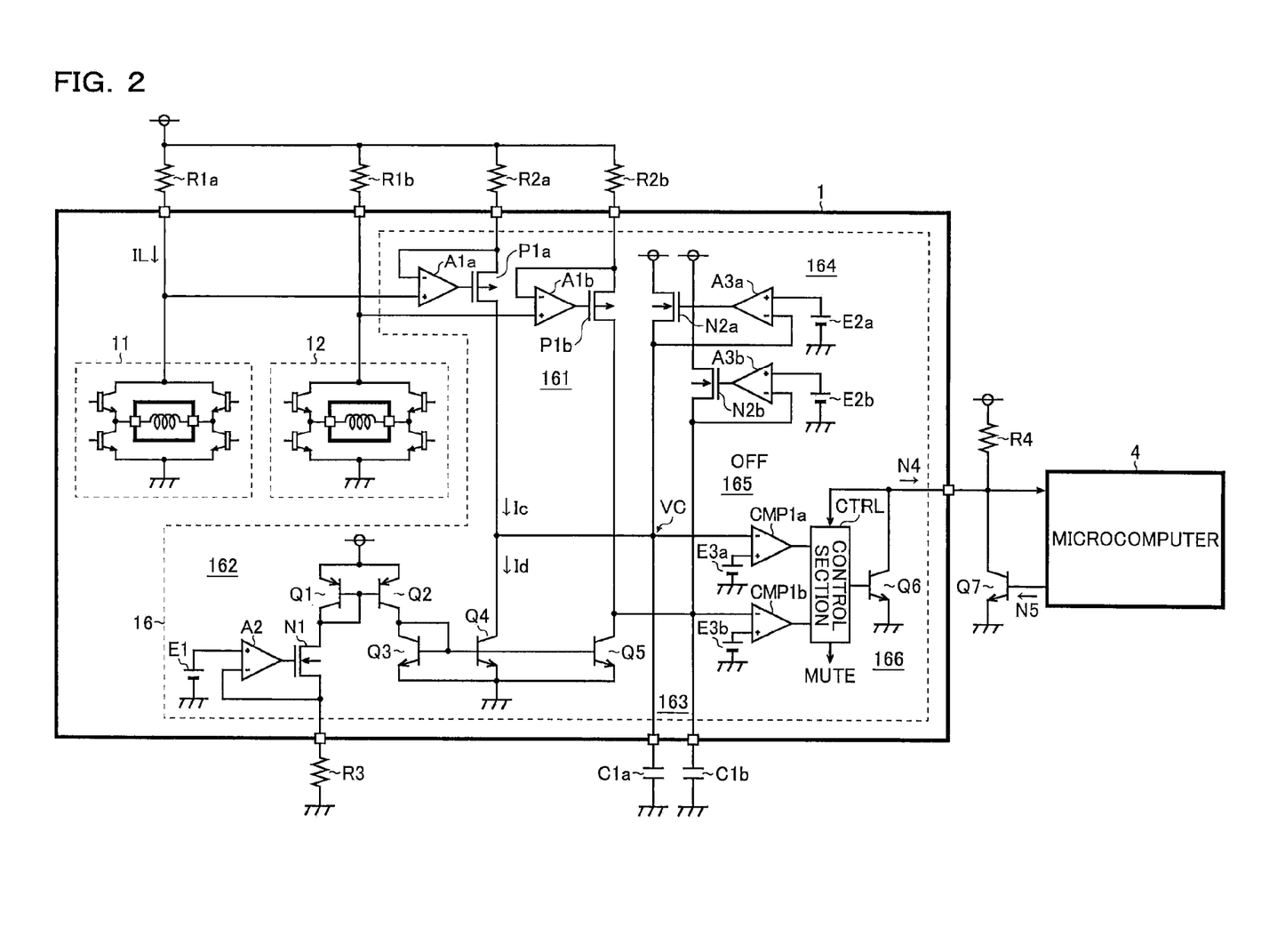
FIG. 2 is a circuit block diagram showing one configuration example of an actuator protection circuit 16.

FIG. 2 is a circuit block diagram showing one configuration example of the actuator protection circuit 16.

As shown in this figure, the actuator protection circuit 16 of this embodiment has: a first current generation section 161, a second current generation section 162, an integration section 163, a bias section 164, a comparison section 165, and an output section 166.

The first current generation section 161 has: amplifiers A1$a$ and A1$b$ and P-channel field effect transistors P1$a$ and P1$b$, which are all built in the motor driver IC1; and resistors R1$a$ and R1$b$ and resistors R2$a$ and R2$b$, which are all externally fitted to the motor driver IC1.

The non-inverting input terminal (+) of the amplifier A1$a$ is connected to a power input node of the focus servo driver circuit 11 and also connected via the resistor R1$a$ to a supply voltage application node. The inverting input terminal (−) of the amplifier A1$a$ is connected to the source of the transistor P1$a$ and also connected via the resistor R2$a$ to the supply voltage application node. The output terminal of the amplifier A1$a$ is connected to the gate of the transistor P1$a$.

The non-inverting input terminal (+) of the amplifier A1$b$ is connected to a power input node of the tracking servo driver circuit 12 and also connected via the resistor R1$b$ to the supply voltage application node. The inverting input terminal (−) of the amplifier A1$b$ is connected to the source of the transistor P1$b$ and also connected via the resistor R2$b$ to the supply voltage application node. The output terminal of the amplifier A1$b$ is connected to the gate of the transistor P1$b$.

In the first current generation section 161 formed with the configuration described above, a monitor current Ic (first current), proportional to a driving current IL of the focus servo driver circuit 11, is drawn from the drain of the transistor P1$a$. Provided that a current value of the driving current IL is iL, a current value of the monitor current Ic is ic, a resistance value of the resistor R1$a$ is r1$a$, and a resistance value of the resistor R2$a$ is r2$a$, a relational expression ic=(r1$a$/r2$a$)× iL holds. Similarly, a monitor current proportional to a driving current of the tracking servo driver circuit 12 is drawn from the drain of the transistor P1$b$.

In this manner, by directly detecting the current value of the driving current IL from detectors (the resistors R1$a$ and R1$b$ provided on the power source side in this embodiment) serially provided on the power source side or the ground side, the current value of the driving current IL can be detected with high accuracy.

The second current generation section 162 has: an amplifier A2, a direct current voltage source E1, an N-channel field effect transistor N1, pnp bipolar transistors Q1 and Q2, and npn bipolar transistors Q3 to Q5, which are all built in the motor driver IC1; and a resistor R3 which is externally fitted to the motor driver IC1.

The non-inverting input terminal (+) of the amplifier A2 is connected to a positive terminal of the direct current voltage source E1. The negative terminal of the direct current voltage source E1 is connected to a grounding node. The inverting input terminal (−) of the amplifier A2 is connected to the source of the transistor N1 and also connected to a grounding node via the resistor R3. The output terminal of the amplifier A2 is connected to the gate of the transistor N1. The drain of the transistor N1 is connected to the collector of the transistor Q1. The emitters of the transistors Q1 and Q2 are each connected to a supply voltage application node. The bases of the transistors Q1 and Q2 are each connected to the collector of the transistor Q1. The collector of the transistor Q2 is connected to the collector of the transistor Q3. The emitters of the transistors Q3 to Q5 are each connected to a grounding node. The bases of the transistors Q3 to Q5 are each connected to the collector of the transistor Q3. The collector of the transistor Q4 is connected to the drain of the transistor P1$a$. The collector of the transistor Q5 is connected to the drain of the transistor P1$b$.

In the second current generation section 162 formed with the configuration described above, by using a first current mirror circuit composed of the transistors Q1 and Q2 and a second current mirror circuit composed of the transistors Q3 to Q5, a mirror current Id (second current) proportional to a constant current flowing to the resistor R3 is drawn into the collector of the transistor Q4. In addition, as described above, a mirror current proportional to the constant current flowing to the resistor R3 is also drawn into the collector of the transistor Q5.

In this manner, with the configuration including constant current sources (the amplifier A2, the transistor N1, the direct current voltage source E1, and the resistor R3) generating a constant current and the current mirror circuits (transistors Q1 to Q5) generating the mirror current Id from the aforementioned constant current, current values of the mirror currents Id used for detection of overcurrent in the focus servo driver circuit 11 and the tracking servo driver circuit 12 can be collectively set by appropriately selecting the externally fitted resistor R3.

The integration section 163 has capacitors C1$a$ and C1$b$ externally fitted to the motor driver IC1.

One terminal of the capacitor C1$a$ is connected to a connecting node between the drain of the transistor P1$a$ and the collector of the transistor Q4. The other terminal of the capacitor C1$a$ is connected to a grounding node. One terminal of the capacitor C1$b$ is connected to a connecting node between the drain of the transistor P1$b$ and the collector of the transistor Q5. The other terminal of the capacitor C1$b$ is connected to a grounding node.

With the integration section 163 formed with the configuration described above, the capacitor C1$a$ is charged and discharged in accordance with magnitude relation between the monitor current Ic and the mirror current Id. More specifically, when the monitor current Ic is larger than the mirror current Id, a differential current (Ic−Id) flows into the capacitor C1$a$ whereby the capacitor C1$a$ is charged. Reversely, when the monitor current Ic is smaller than the mirror current Id, a differential current (Id−Ic) flows out of the capacitor C1$a$ whereby the capacitor C1$a$ is discharged. The same charging and discharging are performed for the capacitor C1$b$. That is, in the integration section 163 of this embodiment, based on a predetermined mirror current Id, a threshold for whether the capacitors C1$a$ and C1$b$ are integrated (charged) toward the protection side or integrated (discharged) toward the release side is set.

The bias section 164 has: amplifiers A3$a$ and A3$b$, N-channel field effect transistors N2$a$ and N2$b$, and direct current voltage sources E2$a$ and E2$b$, which are all built in the motor driver IC1.

The non-inverting input terminal (+) of the amplifier A3$a$ is connected to the positive terminal of the direct current voltage source E2$a$. The negative terminal of the direct current voltage source E2$a$ is connected to a grounding node. The inverting input terminal (−) of the amplifier A3$a$ is connected to the source of the transistor N2$a$ and also connected to one terminal of the capacitor C1$a$. The output terminal of the amplifier A3$a$ is connected to the gate of the transistor N2$a$. The drain of the transistor N2$a$ is connected to a supply voltage application node.

The non-inverting input terminal (+) of the amplifier A3$b$ is connected to the positive terminal of the direct current voltage source E2$b$. The negative terminal of the direct current voltage source E2$b$ is connected to a grounding node. The inverting input terminal (−) of the amplifier A3$b$ is connected to the source of the transistor N2$b$ and also connected to one terminal of the capacitor C1$b$. The output terminal of the amplifier A3$b$ is connected to the gate of the transistor N2$b$. The drain of the transistor N2$b$ is connected to a supply voltage application node.

In the bias section 164 formed with the configuration described above, a terminal voltage VC of the capacitor C1$a$ is biased via the transistor N2$a$ so as not to fall below a predetermined lower limit value Vdef (for example, 1.06 [V]). With such configuration, even when condition that the mirror current Id is larger than the monitor current Ic (that is, the capacitor C1$a$ is discharged whereby the terminal voltage VC thereof decreases) lasts for a long time, a voltage between the collector and emitter of the transistor Q4 does not run short, making it possible to maintain normal operation of the second current generation section 162. For the terminal voltage of the capacitor C1$b$, the same bias control described above is performed via the transistor N2$b$.

The comparison section 165 has: comparators CMP1$a$ and CMP1$b$ and direct current voltage sources E3$a$ and E2$b$, which are all built in the motor driver IC1.

The non-inverting input terminal (+) of the comparator CMP1$a$ is connected to the positive terminal of the direct current voltage source E3$a$. The negative terminal of the direct current voltage source E3$a$ is connected to a grounding node. The inverting input terminal (−) of the comparator CMP1$a$ is connected to one terminal of the capacitor C1$a$.

The non-inverting input terminal (+) of the comparator CMP1$b$ is connected to the positive terminal of the direct current voltage source E3$b$. The negative terminal of the direct current voltage source E3$b$ is connected to a grounding node. The inverting input terminal (−) of the comparator CMP1$b$ is connected to one terminal of the capacitor C1$b$.

In the output section 165 formed with the configuration described above, by using the comparator CMP1$a$, it is determined whether or not the terminal voltage VC of the capacitor C1$a$ has reached a predetermined threshold voltage Vth1 (for example, 3.0 [V]). More specifically, the comparator CMP1$a$ causes its output logic to transit from a high level to a low level when the terminal voltage VC has reached the threshold voltage Vth1. The comparator CMP1$a$, once the terminal voltage VC has reached the threshold value Vth1, thereafter keeps its output logic at a low level until the terminal voltage VC falls down to a threshold voltage Vth2 (for example, 1.06 [V]), which is lower than the threshold voltage Vth1. As a technique of providing such hysteresis, an output voltage of the direct current voltage source E3$a$ can be variably controlled between the threshold voltages Vth1 and Vth2. For the terminal voltage of the capacitor C1$b$, the same determination through comparison can be performed by using the comparator CMP1$b$.

The output section 166 has: a protective operation control section CTRL and an npn bipolar transistor Q6, which are both built in the motor driver IC1; and a resistor R4 and an npn bipolar transistor Q7, which are both externally fitted to the motor driver IC1.

The collector of the transistor Q6 is connected to a supply voltage application node via the resistor R4 and also connected to a protection signal input node of the microcomputer 4, the collector of the transistor Q7, a resetting node of the logic section LG. The emitters of the transistors Q6 and Q7 are respectively connected to grounding nodes. The base of the transistor Q6 is connected to a protection signal output node of the protective operation control section CTRL. The base of the transistor Q7 is connected to a release signal output node of the microcomputer 4.

In the output section 166 formed with the configuration described above, the protective operation control CTRL, based on output logic of the comparators CMP1*a* and CMP1*b*, performs open-close control of the transistor Q6 (and thus control of generation of the protection signal N4) and control of generation of a mute signal MUTE (and thus mute control of the focus servo driver circuit 11 and the tracking servo driver circuit 12).

Next, operation of the actuator protection circuit 16 formed with the configuration described above will be described in detail, referring to FIG. 3.

Figure 3:
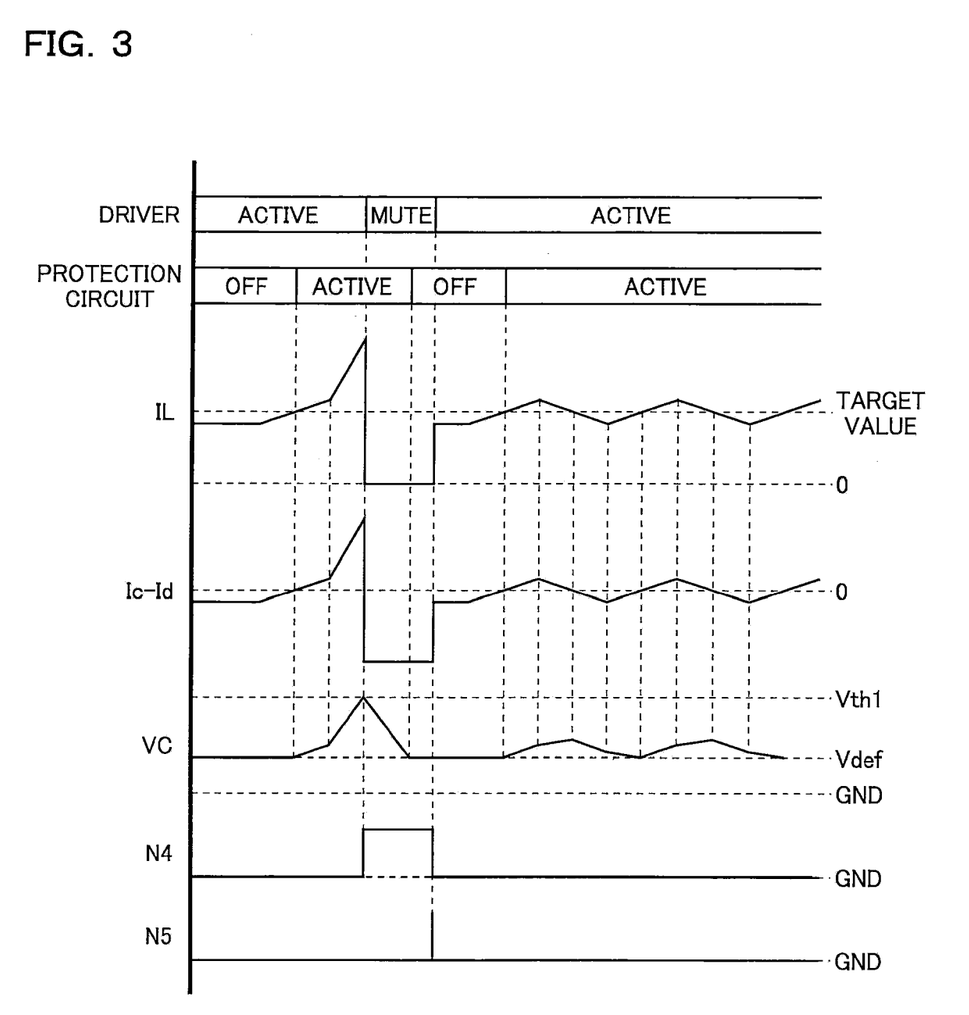
FIG. 3 is a timing chart for explaining operation of the actuator protection circuit 16 shown in FIG. 2.

FIG. 3 is a timing chart for explaining operation of the actuator protection circuit 16 shown in FIG. 2. The upper portion of this figure shows operating condition of the focus servo driver circuit 11, the tracking servo driver circuit 12, and the actuator protection circuit 16; the middle to lower potions thereof show behaviors of the driving current IL of the focus servo driver circuit 11 (or the tracking servo driving circuit 12, similarly hereinafter), differential current between the monitor current Ic and the mirror current Id (Ic−Id), terminal voltage VC of the capacitor C1*a* (or capacitor C1*b* hereinafter), protection signal N4, and release signal N5 of the focus servo driver circuit 11 (or the tracking servo driver circuit 12 hereinafter).

When the driving current IL exceeds a predetermined target value (current value set in accordance with a rating of the focus servo coil 21 or the tracking servo coil 22) and the monitor current Ic becomes larger than the mirror current Id whereby the differential current (Ic−Id) between the two turns positive, the capacitor C1*a* is charged and its terminal voltage VC starts to increase. Thereafter, while the driving current IL is over the predetermined target value, the capacitor C1*a* continues to be charged. At a time when the driving current IL exceeds the predetermined target value, the operating condition of the actuator protection circuit 16 transits from off-state to active state.

When the charging of the capacitor C1*a* proceeds and the terminal voltage VC has reached the predetermined threshold voltage Vth1, the protective operation control section CTRL causes the output logic of the protection signal N4 to transit from a low level to a high level by switching the transistor Q6 from ON to OFF, and also outputs a mute signal MUTE (not shown in FIG. 3) so as to stop (or restrict) the driving of the focus servo driver circuit 11 and the tracking servo driver circuit 12.

In this manner, in the actuator protection circuit 16 of this embodiment, at a time when the terminal voltage VC of the capacitor C1*a* has reached the threshold voltage Vth1, the focus servo driver circuit 11 and the tracking servo driver circuit 12 are voluntarily muted (the driving thereof is stopped or restricted), and this event (transition of the protection signal N4 to a high level) is reported to the microcomputer 4. That is, the driving of each of the focus servo driver circuit 11 and the tracking servo driver circuit 12 is stopped or restricted not only in the event of error occurring on its own side but also in the event of error occurring on the other side.

Such configuration, in the event of error in one of the driver circuits, not only permits quickly activating protective operation for this driver circuit but also permits previously activating protective operation for the other driver circuit at a stage before their errors actually occur. Therefore, the motor driver IC1 of this embodiment, by achieving cooperative error protective operation between multi-channel driver circuits, can improve its safety and reliability.

When the focus servo driver circuit 11 and the tracking servo driver circuit 12 are muted whereby the driving current IL turns zero and when the monitor current Ic becomes smaller than the mirror current Id whereby the differential current (Ic−Id) between the two transits to the minus side, the capacitor C1*a* is discharged and the terminal voltage VC of the capacitor C1*a* starts to decrease. Then at a time when the terminal voltage VC falls down to the threshold voltage Vth2 (reference voltage Vdef in this figure), the operating condition of the actuator protection circuit 16 returns to off-state. At this stage, however, the protection signal N4 does not voluntarily return to a low level, and the focus servo driver circuit 11 and the tracking servo driver circuit 12 continue to be muted.

After the operation condition of the actuator protection circuit 16 returns to off-state, the microcomputer 4 increases the release signal N5 to a high level, and then the transistor Q7 is switched from OFF to ON and the output logic of the protection signal N4 returns from a high level to a low level. The protective operation control section CTRL detects the fall of this protection signal N4, and switches the transistor Q6 from OFF to ON and also releases the mute condition of the focus servo driver circuit 11 and the tracking servo driver circuit 12.

In a case where the operating condition of the actuator protection circuit 16 does not return to off-state, the protective operation control section CTRL, even when the release signal N5 is outputted from the microcomputer 4, does not accepts this signal, thus maintaining the transistor Q6 at off-state, which continues the muting of the focus servo driver circuit 11 and the tracking servo driver circuit 12. That is, the protective operation control section CTRL is configured to release the mute condition only when the terminal voltage VC of the capacitor C1*a* falls down to the threshold voltage Vth2 and also when the release signal N5 is outputted from the microcomputer 4. Such configuration can ensure a sufficient mute period for causing the coil temperature to fall, thus providing margin for burnout.

Note, however, that the operation of releasing the mute condition is not limited to the one described above. Thus, the configuration may be such that the mute condition is voluntarily released at a time when the terminal voltage VC of the capacitor C1*a* falls down to the threshold voltage Vth2, or such that the mute condition is released at correct time in response to user instructions.

After the return from the mute condition, as described above, when the driving current IL exceeds the predetermined target value, the operating condition of the actuator protection circuit 16 is caused to transit from off-state to active-state, and the capacitor C1*a* is charged or discharged in accordance with magnitude relation between the monitor current Ic and the mirror current Id.

In this manner, the actuator protection circuit 16 is configured to temporally integrate a current value of the driving current IL exceeding the predetermined target value and compare a total amount of cumulated charges (terminal voltage VC) with the predetermined threshold voltages Vth1 and Vth2. Thus, when the driving current IL exceeds the predetermined target value, a grace period for muting the focus servo driver circuit 11 and the tracking servo driver circuit 12 becomes inversely proportional to the amount of the aforementioned excess. Therefore, when the driving current IL considerably exceeds the predetermined target value, protection can be provided immediately. Reversely, when the driving current IL slightly exceeds the predetermined target value, protection can be appropriately provided with such a grace period that prevents occurrence of burnout. This therefore permits improvement in the reliability and safety of set design.

Appropriate mute control can be performed in accordance with the degree of urgency in protection. For example, while continuing driving for 10 [s] is permitted for a driving current IL of 100 [mA], continuing driving for only 5 [s] is permitted for a driving current IL of 200 [mA].

In the optical disc driving device of this embodiment, the microcomputer 4 is configured to, upon confirmation of transition of the protection signal N4 to a high level, store into the memory 5 the error history information N3 of the motor driver IC1. Such configuration that error condition of the motor driver IC1 is transmitted to the microcomputer 4 and cumulated as the error history information N3 can contribute to future improvements in technical capabilities and safety.

Moreover, in the optical disc driving device of this embodiment, the microcomputer 4 is configured to, upon confirmation of transition of the protection signal N4 to a high level, report error of the motor driver IC1 by using a display and/or a speaker (not shown). Such configuration permits the user to recognize the error of the motor driver IC1 without delay, which in turn permits quick recovery work and thus improvements in the safety and reliability of the device.

Next, one modified embodiment of the actuator protection circuit 16 will be described in detail, referring to FIGS. 4 and 5.

Figure 4:
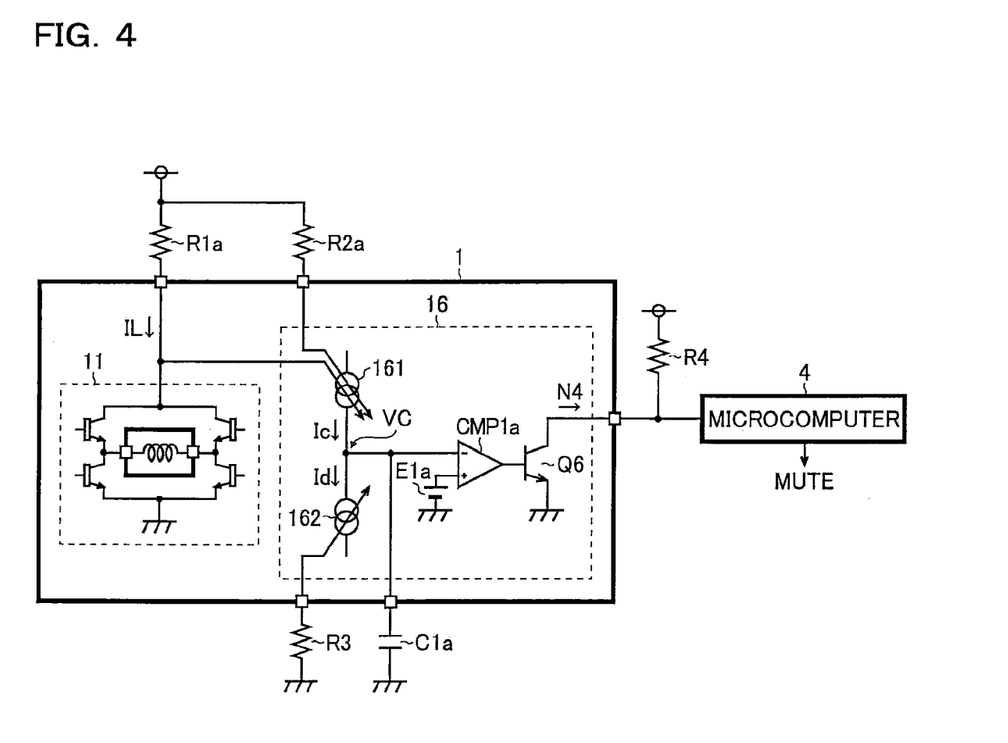
FIG. 4 is a circuit block diagram showing one modified embodiment of the actuator protection circuit 16.
Figure 5:
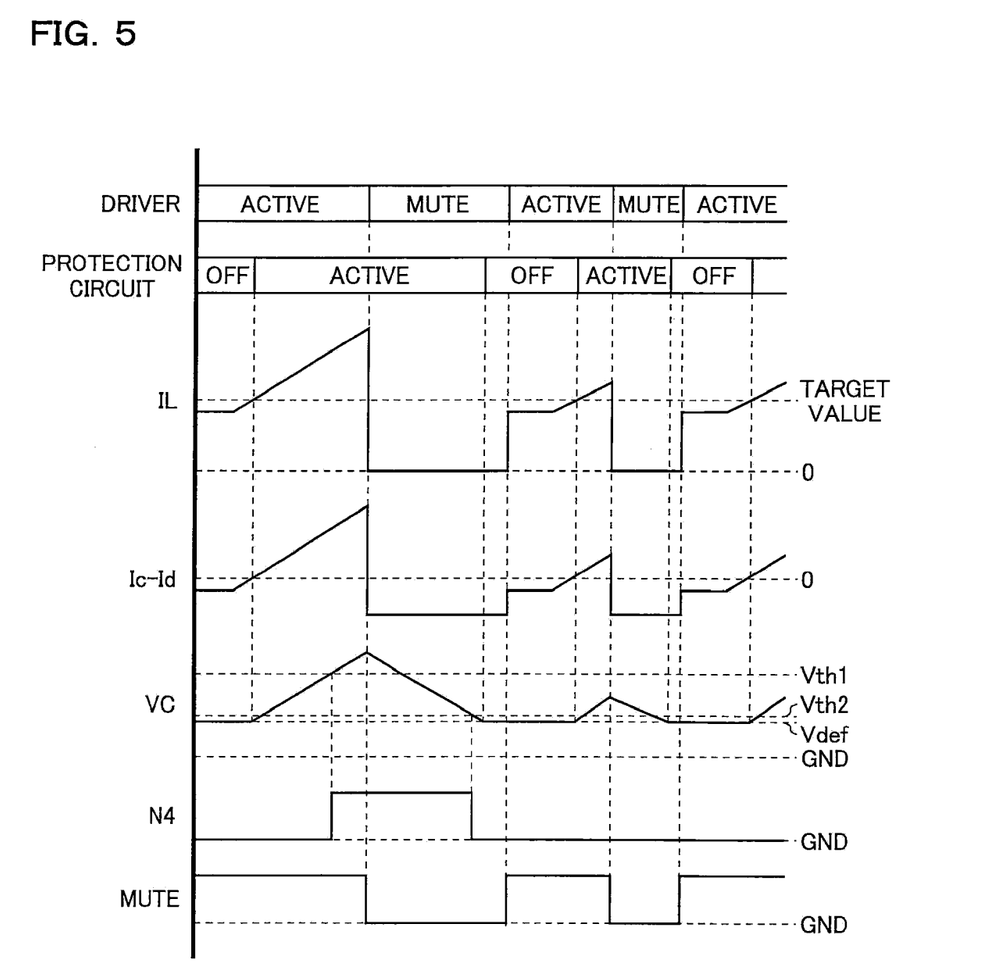
FIG. 5 is a timing chart for explaining operation of the actuator protection circuit 16 shown in FIG. 4.

FIG. 4 is a circuit block diagram showing one modified embodiment of the actuator protection circuit 16. FIG. 5 is a timing chart for explaining operation of the actuator protection circuit 16 shown in FIG. 4. In FIG. 4, for easier explanation, only protection circuits on the focus servo driver circuit 11 side are drawn in a simplified manner, and the basic configuration is the same as that of FIG. 2.

As shown in FIG. 4, the actuator protection circuit 16 of this modified embodiment does not include the protective operation control section CTRL shown in FIG. 2, and is configured to, by using an output signal of the comparator CMP1a, directly perform open-close control of the transistor Q6 to generate the protection signal N4.

Therefore, at a time when the terminal voltage VC of the capacitor C1a has reached the predetermined threshold voltage Vth1, the protection signal N4 is raised to a high level. However, this is just a warning flag for reporting to the microcomputer 4 that overcurrent is generated, and thus unless instructions for muting the focus servo driver circuit 11 and the tracking servo driver circuit 12 are provided by the mute signal MUTE from the microcomputer 4, the driving of these circuits is not voluntarily stopped nor restricted. Thus, the terminal voltage VC of the capacitor C1a continues to increase even after the transition of the protection signal N4 to a high level.

Thereafter, upon fall of the mute signal MUTE from the microcomputer 4 to a low level, the focus servo driver circuit 11 and the tracking servo driver circuit 12 are muted, and the terminal voltage VC of the capacitor C1a starts to fall. Then at a time when the terminal voltage VC falls down to the threshold voltage Vth2 (in this figure, a voltage slightly higher than the reference voltage Vdef; for example, for the reference voltage Vdef=1.06 [V], threshold voltage Vth2=1.1 [V]), the protection signal N4 is returned to a low level. The microcomputer 4, which has confirmed this, raises the mute signal MUTE to a high level, releasing the mute condition of the focus servo driver circuit 11 and the tracking servo driver circuit 12.

In this manner, the actuator protection circuit 16 of this modified embodiment just outputs the protection signal N4 as a warning flag, and the microcomputer 4 is left in charge of determining whether or not to mute the focus servo driver circuit 11 and the tracking servo driver circuit 12. Therefore, the microcomputer 4 can give instructions for muting simultaneously with the transition of the protection signal N4 to a high level, and can also give instructions for muting with some grace period. Alternatively, the microcomputer 4 can also give instructions for muting on its own based on user operation or the like without depending on the protection signal N4.

The above embodiment has been described, referring to a case where the invention is applied to an actuator that drives a pickup lens, although a target to which the invention is applied is not limited thereto. The invention is widely applicable as burn-out preventing technology, for example, for load driving devices, such as a position driving device for an aberration correcting lens for use in a blue ray disc driving device or the like, a tilt servo driver circuit or a stepping motor driver circuit loaded in a DVD driving device or the like, and loads (for example, voice coil motor) in electric devices.

Various modifications can be made to the configuration of the invention within a range not departing from the spirit of the invention.

For industrial applicability of the invention, the invention is effective technology in improving safety and reliability of a car navigation system, a car audio system, a portable navigation system, or the like which is provided with an optical disc driving device for performing reproduction on an optical disc such as a DVD, a CD, a MD, or the like.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A load driving device comprising:
    a first current generation section generating a first current in accordance with a driving current of a load;
    a second current generation section generating a predetermined second current;
    an integration section charging and discharging a capacitor in accordance with magnitude relation between the first current and the second current;
    a comparison section comparing a terminal voltage of the capacitor and a predetermined threshold voltage; and
    an output section generating a protection signal based on output logic of the comparison section.

2. The load driving device according to claim 1, further comprising a bias section performing biasing so that the terminal voltage of the capacitor does not fall below a predetermined lower limit.

3. The load driving device according to claim 1,
    wherein the first current generation section directly detects a current value of the driving current by using a detector serially connected to a power source side or ground side of the load.

4. The load driving device according to claim 1,
    wherein the second current generation section includes: a constant current source generating a constant current;

and a current mirror circuit generating the second current by mirroring the constant current.

5. An electric device comprising:

a load driving device;

at least one load receiving supply of a driving current from the load driving device; and a microcomputer receiving an input of a protection signal from the load driving device, wherein the load driving device includes: a first current generation section generating a first current in accordance with the driving current of the load; a second current generation section generating a predetermined second current; an integration section charging and discharging a capacitor in accordance with magnitude relation between the first current and the second current; a comparison section comparing a terminal voltage of the capacitor and a predetermined threshold voltage; and an output section generating the protection signal based on output logic of the comparison section.

6. The electric device according to claim 5, wherein the output section includes a protective operation control section muting driving of the load based on the output logic of the comparison section.

7. The electric device according to claim 6, wherein the protective operation control section releases the mute condition of the load based on a release signal from the microcomputer.

8. The electric device according to claim 5, wherein the microcomputer, based on the protection signal, mutes or releases the driving of the load.

9. The electric device according to claim 5, wherein the microcomputer, upon reception of an input of the protection signal, stores error history information of the load driving device into a memory.

10. The electric device according to claim 5, wherein the microcomputer, upon reception of an input of the protection signal, reports error of the load driving device by using at least one of a display and a speaker.

* * * * *